Figure 1:
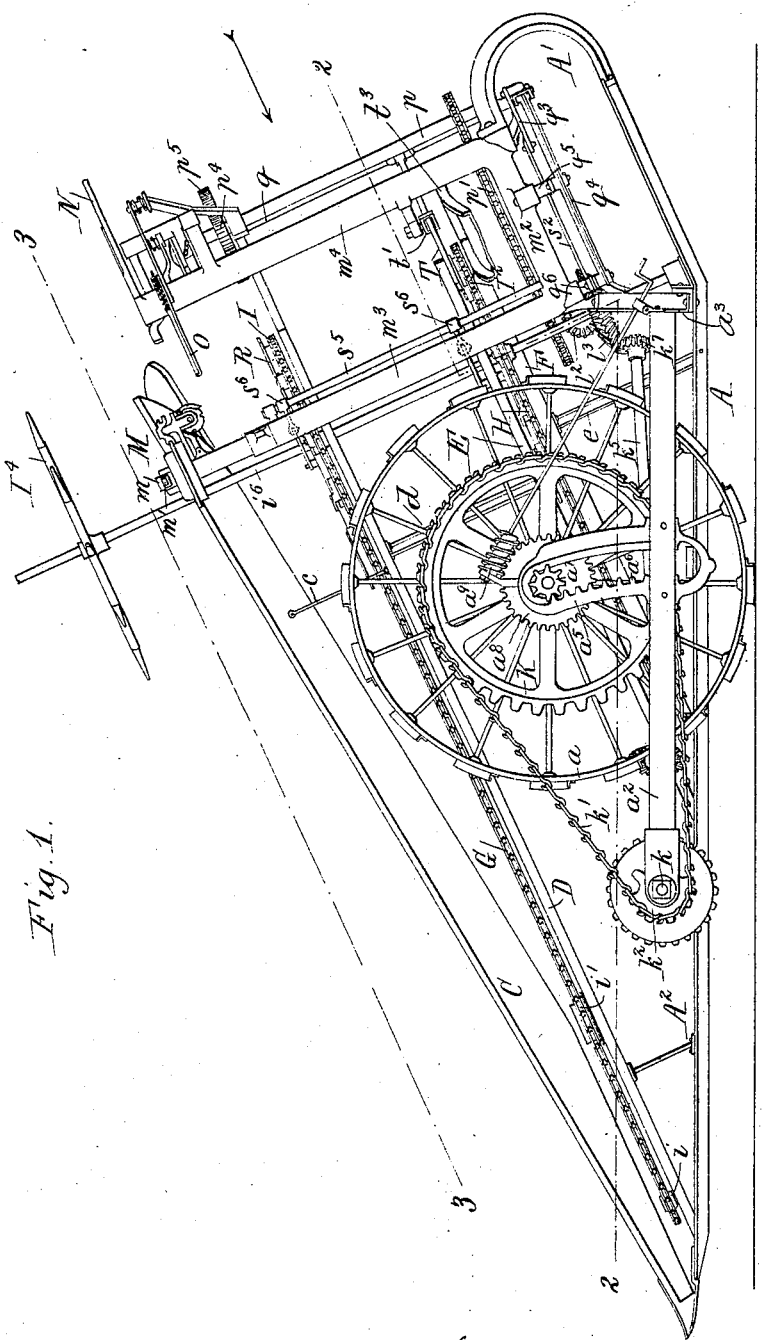

No. 787,496. PATENTED APR. 18, 1905.
H. J. CASE.
GRAIN HARVESTER.
APPLICATION FILED APR. 17, 1903.

4 SHEETS—SHEET 1.

Witnesses:
R. W. Purser
E. A. Volk.

Henry J. Case   Inventor.
By Wilhelm Bonner
Attorneys.

No. 787,496. PATENTED APR. 18, 1905.
H. J. CASE.
GRAIN HARVESTER.
APPLICATION FILED APR. 17, 1903.
4 SHEETS—SHEET 2.
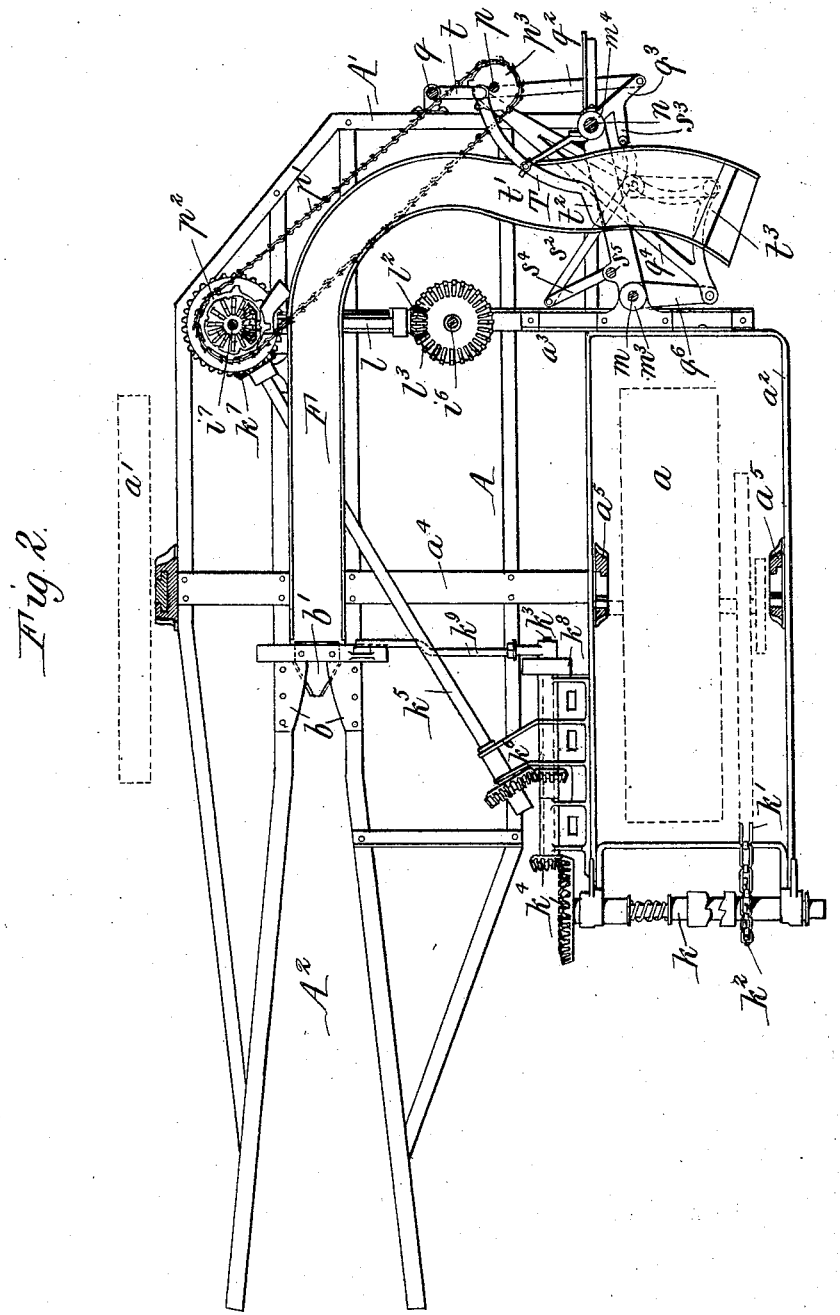

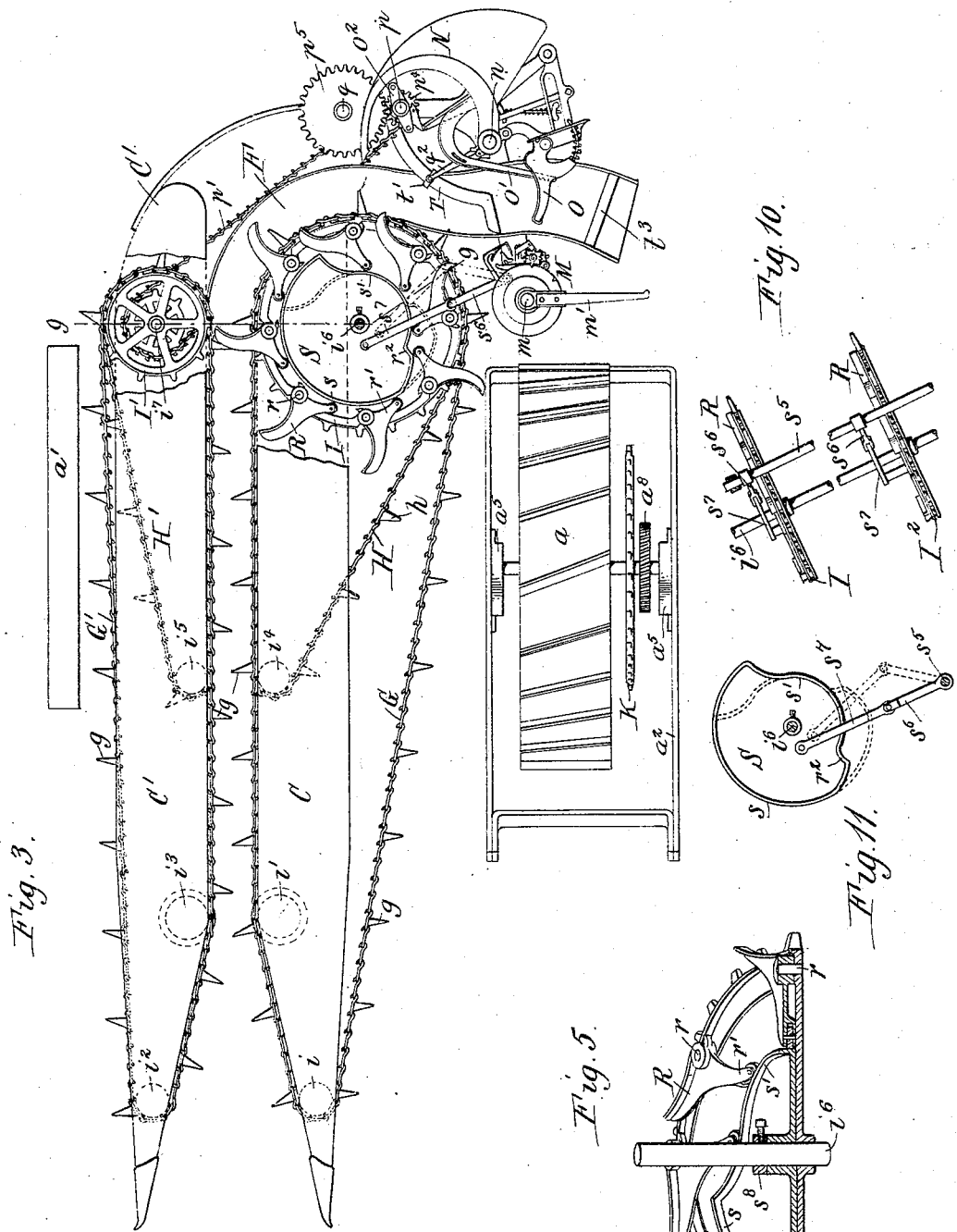

No. 787,496. PATENTED APR. 18, 1905.
H. J. CASE.
GRAIN HARVESTER.
APPLICATION FILED APR. 17, 1903.
4 SHEETS—SHEET 4.
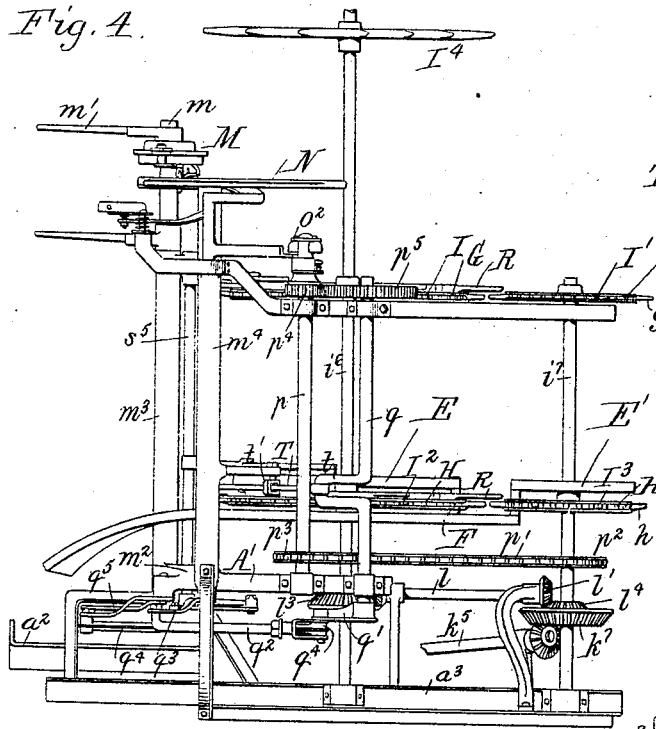
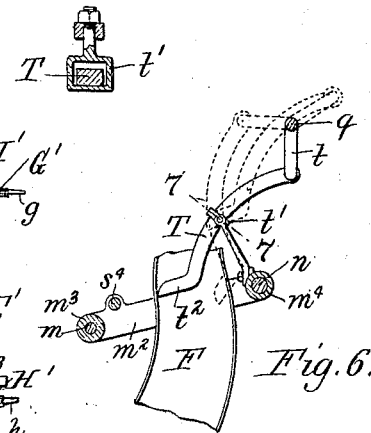
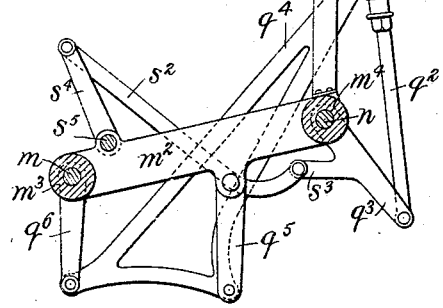
Witnesses:
R. W. Punser
E. A. Volk.
Henry J. Case Inventor.
By Wilhelm Bonner
Attorneys.

No. 787,496. Patented April 18, 1905.

UNITED STATES PATENT OFFICE.

HENRY J. CASE, OF OWASCO, NEW YORK, ASSIGNOR TO ADRIANCE PLATT & COMPANY, OF POUGHKEEPSIE, NEW YORK.

GRAIN-HARVESTER.

SPECIFICATION forming part of Letters Patent No. 787,496, dated April 18, 1905.

Application filed April 17, 1903. Serial No. 153,090.

*To all whom it may concern:*

Be it known that I, HENRY J. CASE, a citizen of the United States, and a resident of Owasco, in the county of Cayuga and State of New York, have invented new and useful Improvements in Grain-Harvesters, of which the following is a specification.

This invention relates to that class of machines which are designed for harvesting Indian corn or maize and similar crops, and more particularly to that type of such machines in which the stalks are conveyed in an approximately upright position to the binding mechanism and are tied in bundles in that position.

The objects of this invention are to improve the construction, arrangement, and organization of the different mechanisms embodied in the machine with a view of rendering the machine simple in construction, durable and efficient in operation, and to improve particularly the mechanism by which the stalks are conveyed to the binding mechanism and the means for discharging the tied bundles.

In the accompanying drawings, consisting of four sheets, Figure 1 is an elevation of the machine viewed from the stubbleward side. Figs. 2 and 3 are sectional diagrammatic plan views in lines 2 2 and 3 3, Fig. 1, respectively. Fig. 4 is a rear elevation of the binder mechanism and connecting parts viewed in the direction of the arrow 4, Fig. 1. Fig. 5 is a sectional perspective view of one of the feeding-wheels. Fig. 6 is a plan view of the butt-ejector. Fig. 7 is a cross-section of the same in line 7 7, Fig. 6, on an enlarged scale. Fig. 8 is a plan view of the parts connecting the needle-shaft, knotter-shaft, and butt-ejector shaft on an enlarged scale. Fig. 9 is a sectional elevation in line 9 9, Fig. 3, looking forward. Fig. 10 is a fragmentary side elevation of the feeding-cams and other shifting mechanism. Fig. 11 is a fragmentary top plan view of one of these cams and its shifting mechanism.

Like letters of reference refer to like parts in the several figures.

The frame A of the machine is constructed in any suitable manner and is supported on the stubbleward side by a master-wheel $a$ and at the grainward side by a supporting-wheel $a'$. The main portion of the frame A, to which these wheels are attached, is substantially horizontal, while the rear portion $A'$ of this frame is inclined and ascends rearwardly. The master-wheel is arranged in a side frame $a^2$, secured to the side of the main portion $A'$ of the frame. $a^3$ is a cross-bar in the main frame arranged at the junction of the horizontal main portion and the inclined rear portion of the frame. $a^4$ is a cross-bar which connects the longitudinal members of the frame between the master-wheel and the supporting-wheel. The master-wheel is adjustable, as usual, in curved guides $a^5$, provided with teeth $a^6$, by a pinion $a^7$, gear-wheel $a^8$, and worm $a^9$. Any other suitable construction of the frame and supporting parts may, however, be employed.

The cutter mechanism is arranged, as usual, near the rear ends of the forwardly-diverging portions $A^2$ of the main frame and in front of the cross-bar $a^4$ and may consist of a stationary cutter $b$ and a reciprocating cutter $b'$.

C C' represent the longitudinal divider-boards, which ascend rearwardly from the front ends of the main frame on opposite sides of the upper portion of the stalk-passage and are inclined toward each other.

D D' represent the upper pair of conveyer-boards, which are arranged below the divider-boards C C' and also ascend rearwardly, but are horizontal in a transverse direction.

E E' represent the lower pair of conveyer-boards, which are arranged below and in rear of the upper conveyer-boards D D' and parallel therewith. These lower boards have their front ends arranged at a considerable distance in rear of those of the upper boards. As shown in Fig. 1, the lower conveyer-boards E E' are supported near their rear ends from the main frame by inclined braces $e$, the upper conveyer-boards D D' from the lower boards by braces $d$, and the divider-boards C C' from the upper conveyer-boards by braces $c$.

F represents the bottom of the stalk-passage, which extends from the cutter mechanism rearwardly and upwardly on the grain-ward side of the lower stubbleward conveyer-board E and stubbleward around the rear end of this board over the inclined rear portion A' of the main frame and in rear of the master-wheel and then forwardly to its discharge end on the stubbleward side of the master-wheel. The longitudinal portion of this bottom is horizontal in a transverse direction, while its transverse rear portion is inclined like the rear portion of the frame, so that the stalks lean forwardly in passing stubbleward over the rear portion of this bottom past the binding mechanism.

G G' represent the upper conveyer-chains, which are arranged above the upper conveyer-boards D D', and H H' represent the shorter lower conveyer-chains, which are arranged under the lower conveyer-boards E E'. These chains are provided, respectively, with comparatively short teeth $g$ and $h$. The stubbleward upper chain G is driven at the rear end of the board D by a sprocket-wheel I and passes around guide-wheels $i$ $i'$ near the front end of this board. The grainward upper chain G' is driven at the rear end of the board D' by a sprocket-wheel I' and is guided near the front end of this board by wheels $i^2$ $i^3$. The lower stubbleward conveyer-chain is driven at the rear end of the board E by a sprocket-wheel $I^2$ and guided near the front end of this board by a guide-wheel $i^4$. The lower grainward conveyer-chain is driven at the rear end of the board E' by a sprocket-wheel $I^3$ and guided near the front end of this board by a guide-wheel $i^5$. The stubbleward driving sprocket-wheels I $I^2$ are secured to a forwardly-leaning shaft $i^6$, which is journaled at its lower end on the main frame, and the grainward driving sprocket-wheels I' $I^3$ are secured to a similar shaft $i^7$. The latter is driven from the master-wheel by intermediate mechanism, as shown in Fig. 2, and drives in turn the shaft $i^6$ and the binding and discharge mechanisms.

The mechanism by which the grainward sprocket-shaft $i^7$ is driven from the master-wheel may be of any suitable construction and as shown in the drawings is constructed as follows: K is a sprocket-wheel secured to the outer side of the master-wheel, and $k$ a transverse counter-shaft which is arranged in front of the master-wheel and driven from the sprocket-wheel K by a chain $k'$ and pinion $k^2$. $k^3$ is a longitudinal counter-shaft which is arranged on the grainward side of the master-wheel and driven from the transverse counter-shaft $k$ by bevel gear-wheels $k^4$. $k^5$ is a diagonal intermediate shaft which is geared at its front end by gears $k^6$ with the longitudinal counter-shaft $k^3$ and at its rear end with the lower end of the grainward sprocket-shaft $i^7$ by gear-wheels $k^7$. The longitudinal counter-shaft $k^3$ is provided at its rear end with a crank-wheel $k^8$ from which the reciprocating cutter is driven by a pitman $k^9$.

The stubbleward sprocket-shaft $i^6$ is driven from the lower end of the grainward sprocket-shaft $i^7$ by a transverse shaft $l$, Figs. 2, 4, and 9, provided with bevel-pinions $l'$ $l^2$, which mesh with wheels $l^3$ $l^4$ on these shafts. The grainward sprocket-wheels I' $I^3$ are considerably smaller in diameter than the stubbleward sprocket-wheels I $I^2$, and these pinions and gear-wheels are so proportioned that the stubbleward sprocket-shaft is driven at the reduced speed necessary to cause the stuubleward conveyer-chains to travel with the same speed as the grainward chains.

M represents a knotter mechanism of ordinary construction secured to the upper end of the knotter-shaft $m$, which also carries near its upper end a discharge-arm $m'$.

N represents a needle or binder arm of ordinary construction secured to the upper end of a shaft $n$.

The knotter-shaft $m$ is arranged in rear of the master-wheel and in front of the bottom F of the stalk-passage and leans forwardly, being arranged in a vertical longitudinal plane and at right angles to the inclined planes of the conveyer-chains and parallel with the sprocket-shafts $i^6$ $i^7$. The needle-shaft $n$ is arranged in rear of the bottom F and is similarly arranged in a forwardly-leaning position. The knotter-shaft and the needle-shaft are journaled in a U-shaped frame of ordinary construction, arranged with its lower portion $m^2$, Figs. 1 and 8, beneath the bottom F of the stalk-passage and having in front and in rear of the latter standards $m^3$ $m^4$, in which these shafts are journaled.

O, Fig. 3, represents the compressor-arm arranged stubbleward of the needle and provided with the usual trip mechanism O'.

$p$, Figs. 2, 3, and 4, represents a driving-shaft which is arranged grainward of the needle-shaft and which is driven near its lower end from the grainward sprocket-shaft $i^7$ by a chain $p'$ and wheels $p^2$ $p^3$. This driving-shaft is provided at its upper end with a pinion $p^4$, which meshes with a wheel $p^5$ on the upper end of a counter-shaft $q$, from which the needle-shaft, the knotter-shaft, and other parts are actuated. The periodical rotation of this counter-shaft from the driving-shaft $p$ once during each operation of tying a bundle is controlled by the trip mechanism O' of the compressor-arm O and a clutch $O^2$ in a well-known manner.

The needle-shaft $n$ is actuated from the shaft $q$ by a crank $q'$ on the latter, a connecting-rod $q^2$, and a rock-arm $q^3$ on the needle-shaft, Figs. 2, 4, and 8. The knotter-shaft $m$ is rotated from the counter-shaft $q$ once during each operation of tying a bundle in a well-known manner by the crank $q'$ on the counter-shaft, a forked connecting-rod $q^4$, connected with a guide-crank $q^5$, and a crank $q^6$ on the knotter-shaft.

The stubbleward sprocket-wheels I $I^2$ are provided with folding teeth R, Figs. 1, 3, and 5, for propelling the stalks through the rear portion of the stalk-passage to the binding mechanism. These teeth are arranged flatwise upon these sprocket-wheels and are pivoted to the rims thereof by pivots $r$, so that the teeth can be projected into the stalk-passage or be withdrawn therefrom. The teeth on each of these feeding-wheels are projected into the stalk-passage by a cam S, which is mounted concentric with the sprocket-wheel and which has a salient portion $s$, by which the teeth are projected into the passage, and a retreating portion $s'$, which permits the teeth to withdraw. The teeth are provided with tailpieces or trailing-arms $r'$, which run in contact with the face of the cam and by which the position of the teeth is controlled. The retreating portion of the cam is provided near its end with a shoulder $r^2$, by which the arms $r'$ are caught and swung rearwardly preparatory to lifting them upon the salient portion of the cam. The cam is so adjusted that the teeth seize the stalks near the rear end of the longitudinal portion of the stalk-passage and propel the stalks toward the binder mechanism and withdraw from the stalks before the latter reach the needle. The cam is shifted circumferentially once for every operation of tying a bundle in a backward direction or contrary to the direction in which the stalks move through the passage, so that the teeth are released sooner or at a greater distance in front of the needle. This backward movement of the cam takes place just before the needle enters the stalk-passage and has the purpose to prevent the teeth from feeding stalks against the back of the needle while the latter stands across the passage. When the needle has been retracted, the cam is returned to its normal position, which is shown in full lines in Fig. 3, while the shifted position of the cam is shown in dotted lines. The oscillating movement of each of these cams is effected from the needle-actuating mechanism by the following means: $s^2$, Fig. 8, represents a connecting-rod which extends from a lug $s^3$ on the needle-actuating rock-arm $q^3$ to an arm $s^4$ on the lower portion of a forwardly-leaning shaft $s^5$, arranged near the knotter-shaft $m$. This cam-actuating rock-shaft $s^5$ is provided with arms $s^6$, Figs. 1, 10, and 11, which are connected by rods $s^7$ with the cam S. Each cam rests upon the adjacent feeding-wheel and is held thereon against accidental displacement by a collar $s^8$, Fig. 5, on the shaft above the cam.

The sprocket-shafts $i^6$ $i^7$ are provided above the divider-boards C C' with one or more wheels I$^4$, Figs. 1 and 4, having fixed teeth which take hold of the tops of the stalks and propel the same rearwardly.

T, Figs. 3 and 6, represents a butt-ejector which is arranged near the bottom F of the stalk-passage underneath the binder mechanism and which takes hold of the butt-end of the tied bundle and pushes the same stubbleward in the stalk-passage. This butt-ejector performs this movement at about the same time that the discharge-arm $m'$ on the knotter-shaft performs its discharge movement, the discharge-arm taking hold of the bundle near the point where the same is tied. The butt-ejector is actuated by a crank $t$ on the counter-shaft $q$ and slides in a slotted guide or loop $t'$, attached to the standard $m^4$ of the needle mechanism. The butt-ejector has a curved-body which slides in this loop or guide, and its free end $t^2$ projects forwardly from this curved body, so as to extend crosswise of the stalk-passage when in its operative position. (Shown in full lines in Fig. 6.) When the butt-ejector is in its position of rest, its free end $t^2$ lies adjacent to the rear wall of the trough-shaped bottom F, as shown in dotted lines in Fig. 6. When the ejector is actuated, it is first swung with its free end across the bottom to the front side thereof and then moved stubbleward over the bottom to eject the bundle, while during the return movement of the ejector the free end of the latter is first swung across the bottom to the rear side thereof and then moved grainward over the bottom to its position of rest. This peculiar movement of the ejector produces a very effective pushing action, which is exerted squarely against the bundle. The bottom F is inclined at its stubbleward end to facilitate the discharge of the bundles and preferably provided with the usual ledge or raised shoulder $t^3$ stubbleward of the binder mechanism for holding the butt-end of the bundle until the latter is thrown off by the discharge-arm and the butt-ejector.

In the operation of the machine the stalks after having been cut are conveyed rearwardly by the conveyer-chains through the longitudinal portion of the stalk-passage and upon approaching the rear end of this portion of the passage are seized by the teeth of the feeding-wheels and conveyed onward by these teeth into the transverse portion of the passage and to the binder mechanism. The teeth crowd the stalks against the compressor-arm and the trip-arm O' until the pressure of the accumulated stalks operates the trip-arm and the latter starts the binder mechanism. The pressure of the stalks against the teeth swings the teeth back on their pivots and causes the teeth to be withdrawn from the stream of stalks as the teeth rotate with the feeding-wheels. Every time the needle moves across the stalk-passage the teeth are released and withdrawn at a greater distance from the needle to prevent the stalks from being crowded against the same. When the bundle of stalks has been tied, it is thrown off by the action of the butt-ejector operating against the butt-end of the bundle and the action of the discharge-arm operating against the bundle near the height at which the bundle is tied. The stalk-passage extends to the stubbleward side of the master-wheel, or nearly so, and the bundles being discharged therefrom fall forwardly on the stubbleward side of the master-wheel. The bundles are in this manner discharged so far stubbleward that sufficient room is left for three horses between the discharged bundles and the standing grain. This arrangement locates the binder mechanism at a considerable distance rearwardly from the axis of the master-wheel; but the rearwardly overhanging weight resulting therefrom is to a large extent counterbalanced by the driving mechanism arranged in front of the axis of the master-wheel.

I claim as my invention—

1. The combination of a stalk-passage having a longitudinal portion and a transverse portion which extends stubbleward from the rear end of the longitudinal portion, an endless conveyer-chain having its operative portion arranged in the longitudinal portion of the stalk-passage, a feed-wheel arranged at the stubbleward side of the stalk-passage at the junction of the longitudinal and transverse portions thereof and having movable teeth, means for projecting said teeth into the stalk-passage and removing the teeth therefrom, and a binder mechanism arranged in rear of the transverse portion of the stalk-passage, substantially as set forth.

2. The combination of a stalk-passage having a longitudinal portion and a transverse portion which extends stubbleward from the rear end of the longitudinal portion, endless conveyer-chains having their operative portions arranged on opposite sides of the longitudinal portion of the stalk-passage, a feed-wheel arranged at the stubbleward side of the stalk-passage at the junction of the longitudinal and transverse portions thereof and having movable teeth, a movable cam for projecting said teeth into the stalk-passage and withdrawing the teeth therefrom, a binder mechanism arranged in rear of the transverse portion of the stalk-passage, and means for automatically shifting said cam in unison with the binder mechanism, substantially as set forth.

3. The combination of a master-wheel on the stubbleward side of the machine, a stalk-passage having a longitudinal portion and a transverse portion which extends stubbleward in rear of the master-wheel, a binder mechanism arranged in rear of the stalk-passage and in rear of the master-wheel, an endless conveyer-chain having its operative portion arranged in the longitudinal portion of the stalk-passage, and a feed-wheel provided with movable teeth and arranged at the junction of the longitudinal and transverse portions of the stalk-passage, substantially as set forth.

4. The combination of a stalk-passage having a longitudinal portion and a transverse portion which extends stubbleward from the rear end of the longitudinal portion and which has a rearwardly-ascending bottom, an endless conveyer-chain having its operative portion arranged in the longitudinal portion of the stalk-passage, a feed-wheel arranged at the stubbleward side of the stalk-passage at the junction of the longitudinal and transverse portions thereof and having movable teeth, said feed-wheel having its axis arranged in a longitudinal vertical plane and leaning forwardly, a binder mechanism arranged in rear of the rear portion of the stalk-passage and having its upright shaft arranged in a longitudinal vertical plane and leaning forwardly, and a knotter mechanism arranged in front of the rear portion of the stalk-passage and having its upright shaft arranged in a longitudinal vertical plane and leaning forwardly, substantially as set forth.

5. The combination of a stalk-passage, a butt-ejector adapted to be moved in the same, an actuating-crank arranged on one side of the stalk-passage and connected with one end of the ejector, and a guide in which the ejector rocks and slides and which is arranged adjacent to the stalk-passage between the actuated end of the ejector and the free end thereof, substantially as set forth.

6. The combination of a stalk-passage, a butt-ejector having a curved body and a straight end, which latter projects crosswise of the passage when the ejector is in its effective position, an actuating-crank arranged on one side of the stalk-passage and connected with one end of the ejector, and a guide in which the ejector rocks and slides and which is arranged adjacent to the stalk-passage between the actuated end of the ejector and the free end thereof, substantially as set forth.

Witness my hand this 14th day of April, 1903.

HENRY J. CASE.

Witnesses:
LLOYD JOHNSON,
C. E. GUFFIN.